United States Patent [19]

Piccinini et al.

[11] 3,957,834

[45] May 18, 1976

[54] PROCESS FOR THE PRODUCTION OF ETHYLENE OXIDE

[75] Inventors: Carlo Piccinini; Morello Morelli; Pierluigi Rebora, all of San Donato Milanese, Italy

[73] Assignee: Snam Progetti, S.p.A., San Donato Milanese, Italy

[22] Filed: Aug. 1, 1973

[21] Appl. No.: 384,693

Related U.S. Application Data

[62] Division of Ser. No. 67,025, Aug. 26, 1970, abandoned.

[30] Foreign Application Priority Data

| Aug. 26, 1969 | Italy | 21262/69 |
| July 29, 1970 | Italy | 28013/70 |
| July 29, 1970 | Italy | 28014/70 |
| July 29, 1970 | Italy | 28015/70 |

[52] U.S. Cl. ............................ 260/348.5 R; 252/476
[51] Int. Cl.² ..................................... C07D 301/10
[58] Field of Search .......................... 260/348.5 R

[56] References Cited

UNITED STATES PATENTS

3,332,887  7/1967  Endler ............................ 252/443

FOREIGN PATENTS OR APPLICATIONS

| 486,735 | 9/1952 | Canada |
| 520,905 | 3/1955 | Italy |
| 1,059,428 | 6/1959 | Germany |
| 205,471 | 9/1959 | Austria |
| 1,055,147 | 1/1967 | United Kingdom |
| 1,191,983 | 5/1970 | United Kingdom |

OTHER PUBLICATIONS

Shen–Wu Wan, Industrial and Engineering Chemistry, Vol. 45, No. 1, Jan. 1953, pp. 234–238.

A. I. Kurilenko et al., National Research Council of Canada, Technical Translation 814 (1959) pp. 1–17.

*Primary Examiner*—Norma S. Milestone
*Attorney, Agent, or Firm*—Ralph M. Watson

[57] ABSTRACT

Ethylene oxide is prepared by oxidizing an ethylene containing feed with oxygen in the presence of a catalyst which comprises an element or a compound of silver, calcium and barium in atomic ratios of 15:2.5:1.

13 Claims, 1 Drawing Figure

FIG. 1

PROCESS FOR THE PRODUCTION OF ETHYLENE OXIDE

This is a division of application Ser. No. 67,025 filed Aug. 26, 1970, now abandoned.

The present invention relates to a process for the production of ethylene oxide by catalytic oxidation of ethylene.

The preparation of ethylene oxide by oxidation of ethylene in presence of suitable catalysts is well known.

Substantially this process can be divided in two groups, in the first one the oxidation is carried out in presence of air, in the second one of pure oxygen.

In both cases use is made of catalysts known in the art as "silver catalysts" — metallic silver is in fact the element that promotes the oxidation of ethylene to ethylene oxide.

It is also known that in the preparation of said catalysts silver may be deposited on suitable supports and in order to improve their activity several investigations have been undertaken.

In industrial processes a mixture containing ethylene in the range from 1 to 30%, preferably from 2 to 10%, and oxygen (or air) in the range from 2 to 8%, is fed on a silver catalysts bed at a temperature from 150° to 400°C. and at a pressure in the wide range from 0.7 to 35 atmospheres, obtaining in that way ethylene oxide which is then recovered.

In the feed, in order to improve ethylene oxide yield, an inhibitor chosen in a wide class of compounds but frequently a halogenated organic compound for instance dichloroethane is generally present.

Contact times range generally from 0.1 to 15 seconds.

An object of the present invention is a process for the production of ethylene oxide starting from feeds that contain ethylene at high concentrations (i.e., concentrations higher than the usual ones namely higher than 10%, preferably higher than 15% and particularly higher than 30% by volume of the whole gaseous mixture) and oxygen on a silver catalyst.

Further object of the present invention is a process for the production of ethylene oxide starting from mixtures that contain beside ethylene at high concentration (as above said) and oxygen also carbon dioxide at high concentration, namely higher than 7%, preferably higher than 15%, and particularly higher than 20% by volume of the whole gaseous mixture, by catalytic oxidation of said gaseous mixture in presence of silver catalysts.

Further objects of the present invention are the preparation of particular catalytic composition, said catalytic compositions and particularly their use in a process which uses gaseous mixtures as above defined.

A further object of the invention is a process for the production of ethylene oxide by oxidation of mixture rich in ethylene with the particular compositions of the invention when in said mixtures ethane is present.

We have now surprisingly found out that it is possible to accomplish a very profitable industrial process if a very concentrated ethylene feed is allowed to contact a silver catalyst, as hereinafter described, at a temperature ranging from values even lower than 150°C. up to 400°C. As very concentrated ethylene feed, we mean a concentration higher than the usual one, namely higher than 30%, a preferable value for the ethylene concentration can be chosen from 40 up to 80%.

Anyway, according to the present invention, ethylene concentration at least of 10% or higher than 10% may be suitably employed.

Oxygen is the preferred oxidizing agent in a concentration ranging from 2 to 8%; therefore according to the present invention the oxidation is carried out with an ethylene/oxygen ratios higher than the ones generally used, which range from 1 to 3. In certain conditions the process according to the present invention allows to make use of higher oxygen amounts. An upper limit can be considered a concentration of 15%. In fact, an ethylene concentration up to 10–15% by volume may be used but it is also possible to make use of higher concentration.

The process can be carried out in the range of pressure and with contact times generally nowaday used in industrial process.

Anyway, operative conditions may vary in wide ranges.

With reference to the catalyst employed in the process according to the present invention, it is not possible to utilize all the catalysts; some of them have little activity and present low selectivity; a general but not limitative criterion for the choice of catalyst may be based on the fact that the best catalysts seem to be the ones having as active part silver and other compounds and/or elements as pure metals, metalloids, halogens or their compounds known for affecting oxidation reaction.

Among said elements and compounds there are the ones known promoters and among these there are alkaline earth metals as for instance calcium and barium, said active part being supported on an inert as carborumdum or allumina or other conventional supports known in the art. When said supports are used, for instance in the case of allumina, it must be preferably porous to better stabilize the active part on the same support.

Catalyst can be used as powder too, that is the active part only (e.g., for fluidized beds) without support.

Preparations of catalysts according to the present invention are illustrated in the following examples.

The process according to the invention shows that an increase of ethylene concentration causes a correspondent increase of selectivity and, contrarily to what generally cited in literature, a reaction velocity decrease.

When the oxidation operation is carried out with the ethylene concentration of the present invention, it is possible to notice substantially no influence by the material constituting the reaction equipment or by saturated hydrocarbons possibly present in the feed or by rare gases possibly present too; such influences have been noticed for some ethylene concentrations and they have been cited in the literature.

A control is usefl only on reactants amounts and, in case of a recycle, on possible reaction products.

Anyway, the process according to the present invention shows a very high versatility.

Said control may be practically limited to the purge.

In fact, as above said, for the ethylene concentrations according to the invention, the carbon dioxide can practically remain into the synthesis loop not showing any negative effect.

This is surprising as at low ethylene concentrations (i.e., lower than 15%) carbon dioxide shows a very negative effect (on the catalyst activity); said effect lowers to negligible values with high concentration of ethylene.

Therefore, in a more general aspect, the present invention concerns also a process for the production of ethylene oxide starting from ethylene and oxygen, or a gas containing high oxygen concentrations, when in the mixtures fed to the reactor the carbon dioxide is present in high concentrations as said carbon dioxide may be, beside ethylene, oxygen, saturated hydrocarbons in case they should be present and other inerts, the remaining of the mixture.

A suitable upper limit may be kept at about 60% of the gaseous mixture, preferably at 50%.

A lower limit may be at 7% or higher, possible at 15% or higher and preferably higher than 20%.

This tolerance for $CO_2$ is particularly referred to the catalysts described in the present invention but not limited to them.

The tolerance, and practically the indifference, to the ethane in the process according to the invention is also surprising.

It is known from the literature that ethane, with the ethylene concentration according to the present invention, has been considered a hydrocarbon to be withdrawn from the feed mixtures (see U.S. Pat. No. 3,119,837). It has been also suggested in the contrary, for ethylene concentrations ranging from 4 to 40% by volume, to introduce ethane as it would have shown a positive effect (see F.P. 1,555,797).

As far as the known techniques do not explain the causes that produce said apparently contrasting effect ("apparently" as the effect is probably caused, also if not well described, by one of the process variables connected with the nature of the feed mixtures, and "contrasting" as in the first case ethane must be withdrawn and in the second it is advantageous to introduce it), the known techniques agree however that said effects are not function either of ethylene concentration or of particular catalytic compositions and in fact the processes claimed by the two cited patents can be executed in presence of any silver catalyst.

It is therefore surprising, as above said, that, according to the present invention, making use of ethylene concentrations equal to the ones of the mentioned processes and also higher a new fact takes place, i.e., the substantial indifference of the process for the presence of ethane starting from a certain value of the ethylene concentration, while at lower concentration said hydrocarbon has really a negative effect. As the mechanism of this phenomenon is not known, said fact shows different behaviours of the catalytic compositions according to the present invention; said different behaviours make different and therefore new, with respect to the known ones the catalytic compositions of this invention as according to the two cited patents the ethane influence is not connected to the nature of the silver catalysts; it shows therefore at the same time that the catalytic compositions of this invention beside to be new are also original and suitable obtain important advantages with respect to known processes when employed for the oxidation of ethylene rich mixtures in the range from 10% by volume to higher concentrations.

It seems in fact critical for obtaining said advantages, operating in accordance with the present invention, that two factors are present at the same time — the particular catalytic composition described and the particular ethylene concentrations. It is also surprising that the particular compositions of the invention are excellent catalysts either for low ethylene concentration processes, the so called air processes, or for the high ethylene concentration processes, oxygen processes, and furtherly they show an excellent behaviour with ethylene increasing concentrations.

Said compositions comprise, as above said, an active part constituted by silver only or silver with at least an alkaline earth metal chosen between calcium and barium.

The preferred compositions are those which contain these three elements. When said elements are present, other elements can be present like other metals or metalloides.

Another important factor is the ratio according to which said elements are present in the active part.

Said ratio must be equal or higher than 1 gram atom of silver for 1 gram atom of alkaline earth metal or of the sum of alkaline earth metals and preferably equal or higher than 4.

Compositions giving good results are those having a ratio between 4 and 15 gram atoms of silver for 1 gram atom of alkaline earth metal or of the sum of alkaline earth metals.

In a preferred form of the present invention, the active part is utilized supported on suitable carriers.

For this purpose ceramic carriers known in the art can be employed. Among them, in a not restrictive way, allumina is mentioned.

Said allumina must present a suitable porosity and be preferably macroporous.

Another important factor is the preparation of these compositions.

Said technique consists substantially in preparing solution of salts soluble into water, said salts being constituted by metals of the active part of the catalysts, precipitating said metals in the solution so as to obtain a powder of active part, preparing a suspension of this powder, treating the carrier with said suspension and finally drying and heat treating the catalyst obtained.

The use of high ethylene concentration in the feed simplifies remarkably the operating cycle and allows, as before mentioned, to accomplish ethylene oxide production in very advantageous conditions.

Figure 1:
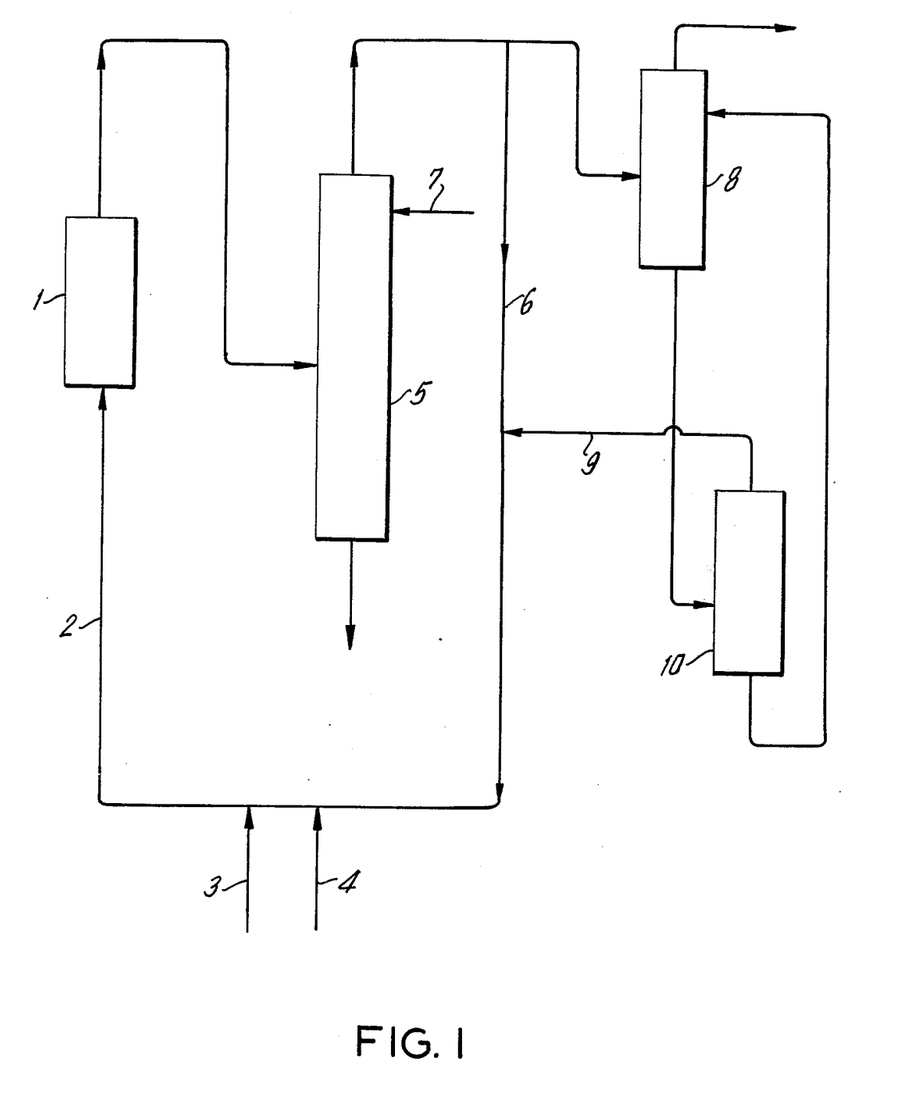

A simplified flow-scheme of the process according to our invention is represented in FIG. 1 where a reactor 1 containing silver catalysts, ethylene and oxygen or mixture containing oxygen are sent through line 2; ethylene and oxygen or mixture containing oxygen are introduced through inlets 3 and 4 respectively; from the reactor 1, a mixture containing ethylene oxide and unreacted compounds are withdrawn.

Said stream is sent to the tower 5 where the ethylene oxide is absorbed while unreacted compounds withdrawn from the top of tower 5 are partially recycled, because of their high ethylene content, directly to the reactor 1 through line 6. Part of said unreacted compounds are sent to tower 8 where the ethylene is scrubbed and where a $CO_2$ and inert gases purge is provided; the ethylene recovered in 10 is recycled to reactor 1 through line 9.

Through inlets 7 and 11 water and ethylene scrubbing agent are introduced.

Between tower 5 and 8 an intermediate stage, e.g., to scrub $CO_2$, and also several oxidation reactors and other conventional equipment known in the art may be provided.

The process according to our invention allows to obtain high selectivity values increasing with the ethylene concentration; furthermore close the higher limits of the preferred concentration range (namely 40–80%) this process allows to operate, if it is convenient — unlike conventional known processes — without inhibitors obtaining in this way an important advantage because of the high purity of the obtained ethylene leaving the reactor without undesirable impurities especially when it is required extremely pure ethylene oxide as in the case of his polymerization.

When the operation is carried out in the presence of an inhibitor, this can be chosen in the wide class of the compounds known in the art for this purpose as, for instance, the halogenated organic compounds and among them dichloroethane is suggested. Practically no limits for the amount of employed inhibitors are considered in the process according to the present invention.

By way of unrestrictive example the amounts of employable inhibitor are lower than 0.3 ppm by volume in the whole gaseous mixture and preferably between 0.01 and 0.3 ppm, but also higher concentration, up to 10+30 ppm, may be employed.

Another advantage is the elimination or the remarkable reduction of the $CO_2$ scrubbing tower as the $CO_2$ is tolerated in the mixtures practically without limitations of concentration and without remarkable influence on the catalysts activity; to remove it from the cycle the purge, always effected in these processes, is generally sufficient. Another advantage is constituted by the tolerance, in the mixture to be treated, for ethane that accordingly can accumulate in the recycles without needing withdrawal sections which would influence the investment and operating costs; these costs are not even increased for the fact that — if not for reasons that could be suggested by different considerations — it is not requested that the plants are provided with a feed of said hydrocarbon as it does not present remarkable effects on the catalysts activity.

In conclusion, if it is present in the fed ethylene, it can be treated as such and the accumulation of the ethane due to the recycles is counterbalanced by the purge always provided in these processes.

A further advantage is that it is possible to operate with oxygen contents even higher than 8% and up to the explosivity limits of the mixtures and it improves the plants productivity.

Another remarkable advantage is that with the same productivity the process according to our invention allows to operate at a temperature lower than in conventional processes; the temperature may reach even 30°C. and sometime lower values, extending in this way the catalysts life. Therefore, in the process according to our invention, the reaction temperature may range from 100° to 400°C.

As shown by the following examples, that show the skilled in the art some form of realization of the process, many other realizations may be derived from these with known techniques; one of the following examples shows the preparation of a catalyst suitable, according to the invention, whether in powder form or supported; in both cases said preparation allowed a good distribution of the active part and a good subdivision of its particles showing in this way that, also without putting forward a theory on the reaction mechanism, it is possible to obtain good results in the process according to the invention.

The tests of the examples have been carried out by gas-chromatography.

EXAMPLE 1

Some tests have been carried out at constant temperature and at several ethylene contents in the feed with a 5/16 inch catalyst prepared in the following way:

100 grams of silver nitrate, 24 grams of tetrahydrate calcium nitrate and 11 grams of barium nitrate were dissolved in 1500 cc of deionized water (Ag/Ca/Ba ratio is 15/2.5/1.

The obtained solution, which may be opalescent because of the presence of small traces of silver chloride that may form, was filtered with adsorbents.

42 grams of anhydrous sodium carbonate were dissolved in 500 cc of distilled and purified water with 2 grams of silver nitrate.

The obtained solution was filtered

Before mixing the two said solutions, a small amount of calcium chloride (about 10 mgs) was added to the nitrate solution.

The coprecipitation of silver calcium and barium carbonates was carried out adding, under rapid mixing, the sodium carbonate solution to the nitrates solution.

Precipitation of the carbonates in a very subdivided form was obtained. Said solution was filtered and the precipitate washed with deionized water and dryed in a stove, in presence of a small air flow, for 4 hours at a temperature of 110°C.

About 120 grams of catalytic powder were obtained; said powder was finely milled in a hammer mill then the milled catalytic powder was sprinkled on the carrier.

The carrier was a commercial one, e.g., allumina having the following characteristics:
(Allumina S.A. 5218 by Norton)
Shape: 5/16 inch diameter Spheres
Composition: $Al_2O_3$, 85.50; $TiO_2$, 0.01; $Na_2O$, 0.03; $SiO_2$, 12.40; Mgo, 0.60; $K_2O$, 0.50; $Fe_2O_3$, 0.20; CaO, 0.40.
Physical chemistry characteristics (X Ray): —$Al_2O_3$ + Mullite
Porous structure:
 porosity by volume — 50.8%
 pores radii — 100–700 microns This carrier presented a porous structure particularly suitable for the purpose, as it allowed to obtain a complete penetration of the catalyst even into the inner parts of the spheres.

Of course, other types of allumina or of carrier presenting the same properties could be used.

The inhibition was carried out mixing the obtained catalytic powder with 800 grams of a 30% ethylenic glycol solution and treating the obtained suspension with 550 grams of carrier kept under stirring to facilitate a uniform inhibition.

The obtained matter was dried and activated under controlled air flow, at about 350°C., for some hours.

Said catalyst, for the execution of the cited tests, has been put in a reactor having a 1 m length and a 1 inch diameter, kept at constant temperature by a dowtherm jacket stirred by nitrogen flow.

The operating conditions were the following:
Pressure: atmospheric
Temperature: 171°C.
Catalyst amount: 484 grams 9.9% of Silver
Flow rate: 210 Nl/hr
Contact time: 4.6 sec.
The results of the tests were:

| No. of the tests | %O in the feed | %C₂H₄ in the feed | reaction velocity C₂H₄ mmoles reacted/hr | Selectivity | T°C. |
|---|---|---|---|---|---|
| 1 | 5 | 40 | 129 | 63 | 171 |
| 2 | 5 | 60 | 80 | 74 | 171 |
| 3 | 5 | 77 | 55 | 76.5 | 171 |

EXAMPLE 2

In the same reactor, at the same operating conditions (except for the temperature) and making use of the same catalyst described in example 1, tests have been carried out at constant reaction velocity, varying the ethylene concentrations and at increasing temperature.
The results obtained were the following one:

| No. of the tests | T°C. | %O₂ feed | %C₂H₄ feed | reaction velocity mmoles of C₂H₄ reacted/hr | Selectivity % moles |
|---|---|---|---|---|---|
| 1 | 155 | 5 | 5 | 55+60 | 57 |
| 2 | 160 | 5 | 40 | 55+60 | 71.5 |
| 3 | 166 | 5 | 60 | 55+60 | 76.5 |
| 4 | 171 | 5 | 77 | 55+60 | 76.5 |

EXAMPLE 3

A series of tests has been carried out in a stainless steel reactor having an inner diameter of 16 mm. and a length of 28 cm provided with an outer jacket wherein a silicon oil, as thermostatic fluid, circulated. The employed catalyst was constituted by a Ag, Ca, Ba carbonates powder prepared as described in example 1 and calcined at 300°C. in air flow. The operating temperature and pressure have been kept respectively at 158°C. and 1 atmosphere.

The tests have been carried out by loading the reactor with 24.5 grams of catalyst (height of catalyst bed – 14.5 cm.) and feeding to the reactor 5 lit/hr. of gaseous mixtures containing 5% of O₂ and from 7% to 60% of ethylene.
The contact time was of 12.8 seconds.
The results of the tests were the following:

| No. of the feed | % O₂ feed | % C₂H₄ feed | reaction velocity mmoles of C₂H₄ reacted/hr. | selectivity % moles |
|---|---|---|---|---|
| 1 | 5 | 32 | 1.50 | 73.6 |
| 2 | 5 | 43 | 1.30 | 74.9 |
| 3 | 5 | 64 | 0.78 | 77.4 |

For 7% ethylene concentration the selectivity was about 62% and for 22% of ethylene it did not exceed 70%.

EXAMPLE 4

In the same reactor and with the same catalyst of example 3, a series of test with different concentrations of ethylene and keeping constant the reaction velocity, by means of the temperature, has been carried out.

The feed mixtures had a constant content of oxygen of about 5% while the ethylene concentration ranged between 7% and 80%; the contact time was 12.8 seconds, as in example 3.
The obtained results were the following ones:

| No. of the test | T°C. | % O₂ | % C₂H₄ | reaction velocity mmoles C₂H₄ reacted/hr. | Selectivity % moles |
|---|---|---|---|---|---|
| 1 | 173.5 | 5 | 32 | 3.70 | 67.6 |
| 2 | 178 | 5 | 43 | 3.67 | 69.2 |
| 3 | 183 | 5 | 64 | 3.73 | 71.0 |
| 4 | 184 | 5 | 73 | 3.75 | 73.2 |
| 5 | 185 | 5 | 83 | 3.76 | 73.4 |

The selectivity increased from about the 57% for feed ethylene concentration of 7%, not exceeding any how 65% when the ethylene concentration was about 20%

EXAMPLE 5

To control the influence of the material with which the reactor was built, two series of tests have been carried out with the same catalyst and with ethylene concentration ranging between 40% and 80%.

In these series of tests the same stainless steel reactor of example 1 and an iron reactor with the same geometric dimensions had been employed. The employed catalyst is similar to the one described in the example 1.
The obtained results of the tests carried out in the stainless steel reactor were:

| No. of the test | T°C. | % O₂ feed | % C₂H₄ feed | reaction velocity mmoles C₂H₄ reacted/hr. | Selectivity % moles |
|---|---|---|---|---|---|
| 1 | 174 | 5 | 40 | 101.3 | 70.8 |
| 2 | 174 | 5 | 60 | 71.8 | 74.8 |
| 3 | 174 | 5 | 77 | 53.1 | 76.6 |

The results of the tests carried out in the iron reactor were:

| No. of the test | T°C. | % O₂ feed | % C₂H₄ feed | reaction velocity mmoles C₂H₄ reacted/hr. | Selectivity % moles |
| --- | --- | --- | --- | --- | --- |
| 1' | 174 | 5 | 40 | 90.0 | 70.3 |
| 2' | 174 | 5 | 60 | 63.6 | 74.6 |
| 3' | 174 | 5 | 77 | 53.5 | 77.5 |

EXAMPLE 6

For checking the influence of ethane on the reaction, a test has been effected with 60% ethylene, 5% of $O_2$, 10% of ethane, 25% of $N_2$; this test has been compared with a test effected with 60% of ethylene, 5% of $O_2$ and 35% of $N_2$.

Both tests have been carried out in the same reactor and at the same operating conditions of Example 1; also the catalyst is similar to the one described in Example 1.

The results of the test were the following:
— tests without ethane:
  temperature = 173°C
  reaction velocity = 80.3 mmoles reacted $C_2H_4$hr.
  selectivity = 73.8 moles
— test with 10% of ethane:
  temperature = 173°C
  reaction velocity = 89.1 mmoles reacted $C_2H_4$/ hr.
  selectivity = 72.6% moles.

EXAMPLE 7

For checking the influence of argon on the reaction two tests have been carried out in the reactor, with the catalyst and at operating conditions described in the example 1; the concentration of the two tests were:
1. 60% $C_2H_4$ - 5% $O_2$ - 35% $N_2$
2. 60% $C_2H_4$ - 5% $O_2$ - 35% Ar.

Both tests have been carried out at 171°C.

The obtained results for the reaction velocity and selectivity were:

| | reaction velocity $C_2H_4$ reacted/ hr. | Selectivity % moles |
| --- | --- | --- |
| Mixture 1) | 79.1 | 74.1 |
| Mixture 2) | 79.4 | 73.8 |

In a test in which nitrogen or argon have been replaced by carbon dioxide at the same concentration, the obtained selectivity was substantially equal to the selectivity of the tests with nitrogen or carbon dioxide.

EXAMPLE 8

Preparation of the catalysts. For this example use has been made of technique of example 1. A precipitation or a co-precipitation in form of carbonates of the elements constituting the active part has been carried out starting from the corresponding solutions of nitrates or of other water soluble salts. Carbonates were so obtained in an extremely subdivided state and were filtered, washed with deionized water and dried in a stove in a weak air flow for some hours at a temperature of about 110°C.

Said materials were then deposited on the carrier. As carrier use was made of the allumina of example 1; said allumina had the following characteristics:
Shape: 5/16 inch diameter spheres
physical chemistry characteristic (X Ray): $\alpha-Al_2O_3$ + Mullite
Porous structure: porosity by volume = 50.8%
Pores radii = 100–700 microns The imbibition of the active part was realized preparing a suspension of said part in mixtures water/ ethylenic glycol and treating the carrier with this suspension.

Then the obtained material was dried in a controlled air flow at a temperature of about 350°C. for some hours. With this technique the catalysts numbered from 1 to 9 have been prepared.

With reference to Table 1 the catalyst numbered 4 bis is an example of separated precipitation on one hand Ag and on the other hand the two promoters Ca and Ba and mechanical mixing of the precipitate while for the catalysts 7, 8 and 9 little amounts of $CaCl_2$, generally about $5.10^{-4}$ gr. per Ag gr., have been added.

In all said catalysts the Ag content is 10% by weight of the finished catalyst.

Variants of this preparation are those in which the preparation of precipitates different from carbonates are provided; for instance the precipitation in form of oxides or the inhibition without using polyoxidrilic alcohols, as for instance a ethylenic glycol, or also the replacement of the operation of co-precipitation with a precipitation of the single constituents followed by a mechanical mixing of all the precipitates.

Another series of catalysts has been prepared with the solution technique. It consists in preparing an organic salt of the silver and of the possible promoters (preferably lactates are prepared) and in impregnating the carrier with said solutions; during the operation the temperature was kept at about 90°–95°C. with variable durations according to the type of carrier and anyway not longer than one hour; afterward the solution was withdrawn and the impregnated material was kept at 90°–95°C. for about 15 minutes.

The catalyst was then put in a stove for 12 hours at 70°–80°C. in a weak air flow; then it was calcined at 320°C. for about 5 hours in a controlled air flow.

With this technique the catalysts numbered from 10 to 15 have been prepared. All the catalysts from 1 to 15 have been employed for the production of ethylene oxide with feeds containing either 5% to 60% of ethylene and 5% of oxygen. The results of the tests are shown in Table 1 where possible variants of the compositions of the feed mixture are indicated. The tests have been carried out in a conventional reactor having a 1 m length, a 1 inch diameter kept at constant temperature by a dowtherm jacket kept in agitation by a nitrogen flow and in such a way to have the same productivity i.e. the same number of moles of ethylene reacted per catalyst unit volume and per hour.

Practically the productivity was kept at a rate of 180–200 mmoles of ethylene per liter of catalyst per hour.

Table 1

| Catalyst No. | Atomic ratio Ag/Ca/Ba | $S^T$ 5% $C_2H_4$ without inhibitor | $S^T$ 5% $C_2H_4$ 0.06ppm inhibitor | °C. % mol. 60% $C_2H_4$ without inhibitor | °C. % mol. 60% $C_2H_4$ 0.12ppm inhibitor | Carrier | Silver % by weight |
|---|---|---|---|---|---|---|---|
| 1 | 15/0/0 | $46^{180}$ | | $67^{190}$ | $77^{220}$ | Φ 5/16"Spheresα $Al_2O_3$ + Mullite porosity: 50.8% by volume (**) pores radii: 100 ÷ 700 microns | 10 |
| 2 | 15/0/1 | $47^{166}$ | | $67^{173}$ | $75^{185}$ | " | " |
| 3 | 15/2/50 | $46^{166}$ | | $70^{170}$ | $76^{180}$ | " | " |
| 4 | 15/25/1 | (a)$40^{181}$ | | $74^{165}$ | $78^{172}$ | " | " |
| 4bis | 15/25/1 | $32^{168}$ | $70^{172}$ | $65^{169}$ | $73^{177}$ | " | " |
| 5 | 15/0/3.5 | $43^{182}$ | (b)$67^{195}$ | $68^{177}$ | $74^{196}$ | " | " |
| 6 | 15/3.5/0 | $41^{170}$ | $71^{203}$ | $67^{176}$ | $74^{198}$ | " | " |
| 7(c) | 15/0/0 | (a)$50^{210}$ | | $63^{197}$ | $71^{212}$ | " | " |
| 8(c) | 15/0/1 | $62^{199}$ | | $61^{199}$ | $70^{209}$ | " | " |
| 9(c) | 15/2.5/0 | (a)$60^{190}$ | | $66^{178}$ | $72^{185}$ | " | " |
| 10 | 200/0/1 | (a)$56^{216}$ | | $57^{212}$ | | CHT-R Φ 3/16" By Carborundum Co. | 14.6 |
| 11 | 14/0/1 | $34^{195}$ | | $47^{201}$ | $65^{219}$ | Carborundum, Φ pores = 50 ÷ 250μ | 14.7 |
| 12 | 14/0/0 | | | | (d)$62^{190}$ | Allumina LA 64 by Norton Φ pores = 2μ total porosity: 0.46 cc/gr | 14.5 |
| 13 | 15/2.5/1 | $33^{192}$ | (b)$60^{213}$ | $57^{194}$ | $66^{205}$ | Allumina, 3/16" Φ pores Φ: 50 ÷ 250μ total porosity: 0.25 cc/gr | 8 |
| 14 | 14/0/1 | $35^{199}$ | $60^{244}$ | $54^{209}$ | $61^{212}$ | Extruded cylinder Alumina Φ 2 mm Length 8 mm pores Φ: 15 ÷ 30μ total porosity: 0.18 cc/gr | 15.1 |
| 15 | 14/0/1 | $34^{195}$ | $52^{250}$ | $52^{205}$ | $61^{205}$ | Allumina Φ 3/16" pores Φ: 50 ÷ 250μ total porosity: 0.25 cc/gr | 8 |

(**) Carriers with different porosity may be suitably employed.

In Table 1 we mean:
S — Selectivity moles %
T°C — Reaction temperature
(a) — Test effected with a mixture of: 5% $C_2H_4$, 6.5% $CO_2$, 6% $O_2$
(b) — Test effected in presence of 0.03 ppm of inhibitor
(c) — Catalyst prepared with $CaCl_2$
(d) — Test effected with a mixture containing 0.24 ppm of inhibitor

EXAMPLE 9

To a reactor made of carbon steel, kept at constant temperature with dowtherm and operating at a pressure of 18 kg/cm², several mixtures have been fed whose compositions are indicated in Table 2.

The table shows the operating temperatures and the obtained results. The other operating conditions have been the same in all the tests so as to make possible a confrontation of them.

Further the catalyst employed in the tests indicated in Table 1 is the same of example 1.

Table 2

| %$C_2H_4$ | %$O_2$ | %$C_2H_6$ | T°C. | Reacted $C_2H_4$ moles/hr. | Selectivity moles % |
|---|---|---|---|---|---|
| 4.9 | 4.0 | — | 216 | 7.1 | 71.7 |
| 5.0 | 4.2 | 10.4 | 205 | 6.8 | 62.8 |
| 20.3 | 4.0 | — | 209 | 7.1 | 75.3 |
| 20.2 | 4.1 | 10.0 | 207 | 7.2 | 71.7 |
| 39.4 | 4.1 | — | 213 | 6.8 | 76.1 |
| 40.1 | 4.1 | 10.5 | 215 | 7.0 | 74.7 |
| 39.4 | 3.9 | — | 233 | 10.5 | 71.3 |
| 40.4 | 4.0 | 10.7 | 233 | 10.0 | 71.8 |
| 40.1 | 4.0 | — | 243 | 11.3 | 69.5 |
| 39.7 | 4.0 | 30.7 | 233 | 11.3 | 67.8 |
| 40.2 | 10.3 | 30.8 | 214 | 13.4 | 69.4 |
| 40.7 | 4.0 | — | 253 | 12.2 | 66.5 |
| 40.8 | 4.1 | 10.8 | 243 | 12.2 | 67.3 |

In each test, beside the indicated components, dichloroethane was fed, as inhibitor, at a concentration of 0.03 ppm by volume with respect to the mixture; the remainders were inerts, above all nitrogen.

The obtained results clearly showed the following trend: at low ethylene concentration (about 5%) the presence of ethane deeply decreased the selectivity; said effect decreased with increasing ethylene concentrations till practically to annul for ethylene concentration of about 40%.

EXAMPLE 10

In a stainless steel reactor, kept at constant temperature with dowtherm and operating at a pressure of 18 kg/cm², seven catalysts have been tested. The ones numbered from 1 to 6 in Table 3 were similar to the ones described in example 1, the one numbered 7 was of the type described in U.S. Pat. No. 2,477,435.

The mixtures compositions are given in Table 3. Beside the cited components also dichloroethane as inhibitor at a concentration of 0.03 ppm by volume with respect to the mixture was fed, the remainders were inerts and especially nitrogen.

The other operating conditions were identical in all the tests so as to make them confrontable.

Table 3

| Catalyst No. | %$C_2H_4$ | %$CO_2$ | %$O_2$ | T°C. | Reacted $C_2H_4$ moles/hr. | Selectivity moles % |
|---|---|---|---|---|---|---|
| 1) | 5.1 | 0 | 4.0 | 218 | 7.3 | 72.1 |
| 2) | 5.3 | 50.3 | 4.0 | 243 | 5.8 | 66.1 |
| 3) | 40.0 | 0 | 4.0 | 215 | 7.0 | 76.5 |
| 4) | 40.1 | 10.0 | 4.0 | 218 | 7.1 | 75.9 |
| 5) | 40.1 | 30.0 | 4.0 | 219 | 7.1 | 73.6 |
| 6) | 40.1 | 50.5 | 4.0 | 223 | 7.2 | 73.6 |
| 7) | 40.0 | 50.2 | 4.1 | 246 | 7.0 | 69.6 |

The tests showed the following trend: at low ethylene concentration (about 5%) the presence of $CO_2$ deeply decreased both the activity and the selectivity of the catalyst; said negative effects decreased remarkably and acceptably for 40% of ethylene.

What we claim is:

1. A process for the production of ethylene oxide which comprises oxidizing an ethylene containing feed with oxygen in the presence of a catalyst which comprises an element or a compound of silver, calcium and barium in atomic ratios of 15:2.5:1 and at a temperature of from 100° to 400°C and at a pressure up to 35 atmospheres.

2. A process as defined in claim 1 wherein the ethylene containing feed has a concentration of higher than 30%.

3. A process as defined in claim 1 wherein the ethylene containing feed has a concentration of from 40 to 80% of ethylene.

4. A process as defined in claim 3 wherein the ethylene containing feed also includes a gas selected from the group consisting of ethane, carbon dioxide and mixtures thereof.

5. A process as defined in claim 1 wherein the catalyst is supported on a ceramic carrier.

6. A process as defined in claim 1 wherein the catalyst is supported on an alumina carrier.

7. A process as defined in claim 1 wherein the pressure ranges between 0.7 and 35 atmospheres.

8. A process as defined in claim 4 wherein ethane is present at a concentration of up to 30%.

9. A process as defined in claim 1 wherein the oxygen concentration varies between 8% and the explosive limit of oxygen in the reaction system.

10. A process as defined in claim 4 wherein at least 20% of carbon dioxide is present in the feed.

11. A process for the production of ethylene oxide by the oxidation of ethylene in a gaseous mixture of 40–80% ethylene, oxygen and inert gases which comprises passing said gaseous mixture over a catalyst which comprises an element or compound of silver, calcium and barium on an alumina support, said catalyst having a Ag:Ca:Ba ratio of 15:2.5:1 and said reaction being carried out at a temperature of from 100° to 400°C and at a pressure of up to 35 atmospheres.

12. A process as defined in claim 11 wherein the carbonates of silver, calcium and barium are employed.

13. A process as defined in claim 11 wherein the pressure ranges between 0.7 and 35 atmospheres.

* * * * *

UNITED STATES PATENT AND TRADEMARK OFFICE
CERTIFICATE OF CORRECTION

PATENT NO. : 3,957,834
DATED : May 18, 1976
INVENTOR(S) : Carlo Piccinini, Morello Morelli, Pierluigi Rebora It is certified that error appears in the above—identified patent and that said Letters Patent are hereby corrected as shown below:

Column 11, Table 1, Catalyst #3,

"15/2/50" should be -- 15/2.5/0 --.

Signed and Sealed this

Seventh Day of September 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,957,834
DATED : May 18, 1976
INVENTOR(S) : Carlo Piccinini et al

It is certified that error appears in the above-identified patent and that said Letters Patent are hereby corrected as shown below:

Column 11, table 1, catalyst no. 4,

"15/25/1" instead of --15/2.5/1--

Signed and Sealed this

Eighth Day of February 1977

[SEAL]

Attest:

RUTH C. MASON
Attesting Officer

C. MARSHALL DANN
Commissioner of Patents and Trademarks